(12) United States Patent
Topchy et al.

(10) Patent No.: US 11,961,527 B2
(45) Date of Patent: *Apr. 16, 2024

(54) METHODS AND APPARATUS TO PERFORM AUDIO WATERMARKING AND WATERMARK DETECTION AND EXTRACTION

(71) Applicant: The Nielsen Company (US), LLC, New York, NY (US)

(72) Inventors: Alexander Pavlovich Topchy, New Port Richey, FL (US); Arun Ramaswamy, Tampa, FL (US); Venugopal Srinivasan, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,681

(22) Filed: Jan. 20, 2023

(65) Prior Publication Data

US 2023/0162744 A1    May 25, 2023

Related U.S. Application Data

(60) Continuation of application No. 17/216,239, filed on Mar. 29, 2021, now Pat. No. 11,562,752, which is a
(Continued)

(51) Int. Cl.
*G10L 19/018* (2013.01)
*G10L 19/022* (2013.01)
(Continued)

(52) U.S. Cl.
CPC .......... *G10L 19/018* (2013.01); *G10L 19/022* (2013.01); *G10L 19/06* (2013.01);
(Continued)

(58) Field of Classification Search
None
See application file for complete search history.

(56) References Cited

U.S. PATENT DOCUMENTS

| | | | |
|---|---|---|---|
| 3,004,104 A | 10/1961 | Hembrooke |
| 3,845,391 A | 10/1974 | Crosby |

(Continued)

FOREIGN PATENT DOCUMENTS

| | | |
|---|---|---|
| AU | 678163 | 11/1993 |
| AU | 718227 | 11/1997 |

(Continued)

OTHER PUBLICATIONS

Australian Government, "Notice of Acceptance," mailed in connection with Australian patent application No. 2008321318, dated Oct. 18, 2012, 3 pages.

(Continued)

*Primary Examiner* — Qin Zhu

(57) ABSTRACT

Methods and apparatus to perform audio watermarking and watermark detection and extraction are disclosed. Example apparatus disclosed herein are to select frequency components to be used to represent a code, different sets of frequency components to represent respectively different information, respective ones of the frequency components in the sets of frequency components located in respective code bands, there being multiple code bands and spacing between adjacent code bands being equal to or less than the spacing between adjacent frequency components in the code bands. Disclosed example apparatus are also to synthesize the frequency components to be used to represent the code, combine the synthesized frequency components with an audio block of an audio signal, and output the audio signal and a video signal associated with the audio signal.

20 Claims, 7 Drawing Sheets

Related U.S. Application Data continuation of application No. 16/806,851, filed on Mar. 2, 2020, now Pat. No. 10,964,333, which is a continuation of application No. 15/973,154, filed on May 7, 2018, now Pat. No. 10,580,421, which is a continuation of application No. 15/269,158, filed on Sep. 19, 2016, now Pat. No. 9,972,332, which is a continuation of application No. 13/730,271, filed on Dec. 28, 2012, now Pat. No. 9,460,730, which is a division of application No. 12/249,619, filed on Oct. 10, 2008, now Pat. No. 8,369,972.

(60) Provisional application No. 61/043,952, filed on Apr. 10, 2008, provisional application No. 60/987,280, filed on Nov. 12, 2007.

(51) Int. Cl.

| | |
|---|---|
| *G10L 19/06* | (2013.01) |
| *G10L 25/18* | (2013.01) |
| *H04H 20/31* | (2008.01) |
| *H04H 60/31* | (2008.01) |
| *H04N 19/467* | (2014.01) |
| *H04N 21/2389* | (2011.01) |
| *H04N 21/8358* | (2011.01) |

(52) U.S. Cl.
CPC ..... *H04N 19/467* (2014.11); *H04N 21/23892* (2013.01); *H04N 21/8358* (2013.01); *G10L 25/18* (2013.01); *H04H 20/31* (2013.01); *H04H 60/31* (2013.01); *H04H 2201/50* (2013.01)

(56) References Cited

U.S. PATENT DOCUMENTS

| | | |
|---|---|---|
| 3,919,479 A | 11/1975 | Moon et al. |
| 4,025,851 A | 5/1977 | Haselwood et al. |
| 4,053,710 A | 10/1977 | Advani et al. |
| 4,230,990 A | 10/1980 | Lert, Jr. et al. |
| 4,282,403 A | 8/1981 | Sakoe |
| 4,432,096 A | 2/1984 | Bunge |
| 4,450,531 A | 5/1984 | Kenyon et al. |
| 4,520,830 A | 6/1985 | Flanagan, III |
| 4,533,926 A | 8/1985 | Foldvari et al. |
| 4,547,804 A | 10/1985 | Greenberg |
| 4,624,009 A | 11/1986 | Glenn et al. |
| 4,639,779 A | 1/1987 | Greenberg |
| 4,677,466 A | 6/1987 | Lert, Jr. et al. |
| 4,697,209 A | 9/1987 | Kiewit et al. |
| 4,703,476 A | 10/1987 | Howard |
| 4,739,398 A | 4/1988 | Thomas et al. |
| 4,783,660 A | 11/1988 | Pierce |
| 4,805,020 A | 2/1989 | Greenberg |
| 4,834,724 A | 5/1989 | Geiss et al. |
| 4,843,562 A | 6/1989 | Kenyon et al. |
| 4,931,871 A | 6/1990 | Kramer |
| 4,945,412 A | 7/1990 | Kramer |
| 4,947,436 A | 8/1990 | Greaves et al. |
| 4,967,273 A | 10/1990 | Greenberg |
| 5,023,929 A | 6/1991 | Call |
| 5,113,437 A | 5/1992 | Best et al. |
| 5,121,428 A | 6/1992 | Uchiyama et al. |
| 5,210,820 A | 5/1993 | Kenyon |
| 5,319,735 A | 6/1994 | Preuss et al. |
| 5,436,653 A | 7/1995 | Ellis et al. |
| 5,437,050 A | 7/1995 | Lamb et al. |
| 5,450,490 A | 9/1995 | Jensen et al. |
| 5,504,518 A | 4/1996 | Ellis et al. |
| 5,563,942 A | 10/1996 | Tulai |
| 5,572,246 A | 11/1996 | Ellis et al. |
| 5,574,962 A | 11/1996 | Fardeau et al. |
| 5,579,124 A | 11/1996 | Aijala et al. |
| 5,581,800 A | 12/1996 | Fardeau et al. |
| 5,612,729 A | 3/1997 | Ellis et al. |
| 5,621,454 A | 4/1997 | Ellis et al. |
| 5,629,739 A | 5/1997 | Dougherty |
| 5,650,943 A | 7/1997 | Powell et al. |
| 5,687,191 A | 11/1997 | Lee et al. |
| 5,764,763 A | 6/1998 | Jensen et al. |
| 5,792,053 A | 8/1998 | Skladnev et al. |
| 5,793,432 A | 8/1998 | Mishima et al. |
| 5,822,360 A | 10/1998 | Lee et al. |
| 5,941,822 A | 8/1999 | Skladnev et al. |
| 5,983,172 A | 11/1999 | Takashima et al. |
| 6,002,433 A | 12/1999 | Watanabe et al. |
| 6,002,443 A | 12/1999 | Iggulden |
| 6,026,323 A | 2/2000 | Skladnev et al. |
| 6,061,793 A | 5/2000 | Tewfik et al. |
| 6,115,689 A | 9/2000 | Malvar |
| 6,151,578 A | 11/2000 | Bourcet et al. |
| 6,170,060 B1 | 1/2001 | Mott et al. |
| 6,188,987 B1 | 2/2001 | Fielder |
| 6,205,249 B1 | 3/2001 | Moskowitz |
| 6,226,608 B1 | 5/2001 | Fielder et al. |
| 6,246,345 B1 | 6/2001 | Davidson et al. |
| 6,272,176 B1 | 8/2001 | Srinivasan |
| 6,286,005 B1 | 9/2001 | Cannon |
| 6,317,703 B1 | 11/2001 | Linsker |
| 6,421,445 B1 | 7/2002 | Jensen et al. |
| 6,442,283 B1 | 8/2002 | Tewfik et al. |
| 6,469,749 B1 | 10/2002 | Dimitrova et al. |
| 6,571,144 B1 | 5/2003 | Moses et al. |
| 6,580,809 B2 | 6/2003 | Stach et al. |
| 6,604,072 B2 | 8/2003 | Pitman et al. |
| 6,711,540 B1 | 3/2004 | Bartkowiak |
| 6,725,372 B1 | 4/2004 | Lewis et al. |
| 6,751,337 B2 | 6/2004 | Tewfik et al. |
| 6,807,528 B1 | 10/2004 | Truman et al. |
| 6,845,360 B2 | 1/2005 | Jensen et al. |
| 6,862,355 B2 | 3/2005 | Kolessar et al. |
| 6,871,180 B1 | 3/2005 | Neuhauser et al. |
| 6,968,564 B1 | 11/2005 | Srinivasan |
| 6,983,058 B1 | 1/2006 | Fukuoka et al. |
| 6,996,237 B2 | 2/2006 | Jensen et al. |
| 7,003,131 B2 | 2/2006 | Watson et al. |
| 7,006,555 B1 | 2/2006 | Srinivasan |
| 7,013,468 B2 | 3/2006 | Abercrombie et al. |
| 7,031,491 B1 | 4/2006 | Donescu et al. |
| 7,035,700 B2 | 4/2006 | Gopalan et al. |
| 7,058,223 B2 | 6/2006 | Cox |
| 7,171,016 B1 | 1/2007 | Rhoads |
| 7,174,151 B2 | 2/2007 | Lynch et al. |
| 7,181,044 B2 | 2/2007 | Watson et al. |
| 7,194,752 B1 | 3/2007 | Kenyon et al. |
| 7,269,734 B1 | 9/2007 | Johnson et al. |
| 7,289,643 B2 | 10/2007 | Brunk et al. |
| 7,302,574 B2 | 11/2007 | Conwell et al. |
| 7,316,025 B1 | 1/2008 | Aijala et al. |
| 7,328,153 B2 | 2/2008 | Wells et al. |
| 7,330,812 B2 | 2/2008 | Ding |
| 7,343,492 B2 | 3/2008 | Moskowitz et al. |
| 7,346,514 B2 | 3/2008 | Herre et al. |
| 7,441,712 B2 | 10/2008 | Silverbrook et al. |
| 7,454,327 B1 | 11/2008 | Neubauer et al. |
| 7,454,331 B2 | 11/2008 | Vinton et al. |
| 7,509,115 B2 | 3/2009 | Lynch et al. |
| 7,555,432 B1 | 6/2009 | Gopalan |
| 7,640,141 B2 | 12/2009 | Kolessar et al. |
| 7,660,424 B2 | 2/2010 | Davis |
| 7,712,114 B2 | 5/2010 | Ramaswamy |
| 7,760,790 B2 | 7/2010 | Baum et al. |
| 7,783,889 B2 | 8/2010 | Srinivasan |
| 7,933,417 B2 | 4/2011 | Toyama et al. |
| 7,961,881 B2 | 6/2011 | Jensen et al. |
| RE42,627 E | 8/2011 | Neuhauser et al. |
| 8,000,677 B2 | 8/2011 | Lynch et al. |
| 8,260,113 B2 | 9/2012 | Aijala et al. |
| 8,369,972 B2 | 2/2013 | Topchy et al. |
| 8,457,951 B2 | 6/2013 | Srinivasan et al. |
| 9,460,730 B2 | 10/2016 | Topchy et al. |
| 9,947,327 B2 | 4/2018 | Srinivasan et al. |

(56) References Cited

U.S. PATENT DOCUMENTS

| | | |
|---|---|---|
| 9,972,332 B2 | 5/2018 | Topchy et al. |
| 10,580,421 B2 | 3/2020 | Topchy et al. |
| 10,741,190 B2 | 8/2020 | Srinivasan et al. |
| 10,964,333 B2 | 3/2021 | Topchy et al. |
| 11,557,304 B2 | 1/2023 | Srinivasan et al. |
| 11,562,752 B2 | 1/2023 | Topchy et al. |
| 2001/0051996 A1 | 12/2001 | Cooper et al. |
| 2002/0082731 A1 | 6/2002 | Pitman et al. |
| 2002/0082837 A1 | 6/2002 | Pitman et al. |
| 2002/0126872 A1 | 9/2002 | Brunk et al. |
| 2002/0164046 A1 | 11/2002 | Walker et al. |
| 2002/0178410 A1 | 11/2002 | Haitsma et al. |
| 2003/0005430 A1 | 1/2003 | Kolessar |
| 2003/0054757 A1 | 3/2003 | Kolessar et al. |
| 2003/0055656 A1 | 3/2003 | Tasaki |
| 2003/0131350 A1 | 7/2003 | Peiffer et al. |
| 2003/0161536 A1 | 8/2003 | Iwamura et al. |
| 2003/0179909 A1 | 9/2003 | Wong et al. |
| 2004/0122679 A1 | 6/2004 | Neuhauser et al. |
| 2004/0148159 A1 | 7/2004 | Crockett et al. |
| 2004/0170381 A1 | 9/2004 | Srinivasan |
| 2004/0181799 A1 | 9/2004 | Lu et al. |
| 2005/0015249 A1 | 1/2005 | Mehrotra et al. |
| 2005/0025334 A1 | 2/2005 | Tewfik et al. |
| 2005/0035857 A1 | 2/2005 | Zhang et al. |
| 2005/0043830 A1 | 2/2005 | Lee et al. |
| 2005/0052294 A1 | 3/2005 | Liang et al. |
| 2005/0060147 A1 | 3/2005 | Norimatsu et al. |
| 2005/0200476 A1 | 9/2005 | Forr et al. |
| 2005/0203798 A1 | 9/2005 | Jensen et al. |
| 2005/0216509 A1 | 9/2005 | Kolessar et al. |
| 2005/0232411 A1 | 10/2005 | Srinivasan et al. |
| 2005/0243784 A1 | 11/2005 | Fitzgerald et al. |
| 2005/0268798 A1 | 12/2005 | Neuhauser et al. |
| 2005/0272015 A1 | 12/2005 | Jensen et al. |
| 2006/0020958 A1 | 1/2006 | Allamanche et al. |
| 2006/0028953 A1 | 2/2006 | Jensen et al. |
| 2006/0075237 A1 | 4/2006 | Seo et al. |
| 2006/0120536 A1 | 6/2006 | Kemp |
| 2006/0193490 A1 | 8/2006 | Srinivasan et al. |
| 2006/0195886 A1 | 8/2006 | Ashley |
| 2006/0239503 A1 | 10/2006 | Petrovic et al. |
| 2007/0005118 A1 | 1/2007 | Carter et al. |
| 2007/0014428 A1 | 1/2007 | Kountchev et al. |
| 2007/0016415 A1 | 1/2007 | Thumpudi et al. |
| 2007/0016418 A1 | 1/2007 | Mehrotra et al. |
| 2007/0089552 A1 | 4/2007 | Busch et al. |
| 2007/0124141 A1 | 5/2007 | You |
| 2007/0199013 A1 | 8/2007 | Samari et al. |
| 2007/0274537 A1 | 11/2007 | Srinivasan |
| 2007/0286451 A1 | 12/2007 | Rhoads |
| 2007/0300066 A1 | 12/2007 | Srinivasan |
| 2008/0209219 A1 | 8/2008 | Rhein |
| 2008/0276265 A1 | 11/2008 | Topchy et al. |
| 2009/0037575 A1 | 2/2009 | Crystal et al. |
| 2009/0055196 A1 | 2/2009 | Oh et al. |
| 2009/0119110 A1 | 5/2009 | Oh et al. |
| 2009/0192805 A1 | 7/2009 | Topchy et al. |
| 2009/0234656 A1 | 9/2009 | Oh et al. |
| 2009/0259325 A1 | 10/2009 | Topchy et al. |
| 2010/0049474 A1 | 2/2010 | Kolessar et al. |
| 2010/0226494 A1 | 9/2010 | Lynch et al. |
| 2013/0114831 A1 | 5/2013 | Topchy et al. |
| 2018/0190301 A1 | 7/2018 | Srinivasan et al. |

FOREIGN PATENT DOCUMENTS

| | | |
|---|---|---|
| AU | 747044 | 9/2000 |
| AU | 2006203639 | 9/2006 |
| AU | 2008321318 | 5/2009 |
| CA | 2628654 | 11/1993 |
| CA | 2136054 | 5/1996 |
| CA | 2041754 | 12/2004 |
| CA | 2134748 | 7/2005 |
| CA | 2504552 | 1/2009 |
| CA | 2858944 | 8/2017 |
| CN | 1461565 | 12/2003 |
| DE | 69334130 | 12/2007 |
| DK | 1261155 | 8/2007 |
| EP | 245037 | 11/1987 |
| EP | 385799 | 9/1990 |
| EP | 598682 | 5/1994 |
| EP | 748563 | 1/2003 |
| EP | 887958 | 1/2003 |
| EP | 1261155 | 3/2007 |
| ES | 2284777 | 11/2007 |
| FR | 2559002 | 8/1985 |
| GB | 2460773 | 12/2009 |
| JP | 8500471 | 1/1996 |
| JP | 11-110913 | 4/1999 |
| JP | 2003500702 | 1/2003 |
| JP | 2011503659 | 1/2011 |
| PT | 1261155 | 7/2007 |
| WO | 8810540 | 12/1988 |
| WO | 9322875 | 11/1993 |
| WO | 9411989 | 5/1994 |
| WO | 9527349 | 10/1995 |
| WO | 9841140 | 9/1998 |
| WO | 19699 | 4/2000 |
| WO | 35345 | 6/2000 |
| WO | 72309 | 11/2000 |
| WO | 79709 | 10/2001 |
| WO | 178271 | 10/2001 |
| WO | 2065782 | 8/2002 |
| WO | 3009277 | 1/2003 |
| WO | 3057605 | 7/2003 |
| WO | 2006023770 | 3/2006 |

OTHER PUBLICATIONS

Canadian Intellectual Property Office, "First Office action," mailed in connection with Canadian Patent Application No. 2,705,549, dated Aug. 29, 2012, 2 pages.

Chinese Patent Office, "Second Office action," mailed in connection with Chinese Patent Application No. 200880120098.7, dated Jun. 20, 2012, 4 pages.

Japanese Patent Office, "Summary of Office Action" and Text of Office action, mailed in connection with Japancese Patent Application No. 2010-534075, dated Jul. 3, 2012, 4 pages.

International Bureau, "International Search Report," mailed in connection with International Application No. PCT/US2008/082657, dated Apr. 7, 2009, 4 pages.

European Patent Office, "Examination Report," mailed in connection with European patent application No. 08850597.7-2225, dated Jun. 6, 2012, 9 pages.

Australian Government, "Examiner's Report No. 2," mailed in connection with Australian Patent Application No. 2008321318, dated Feb. 21, 2012, 2 pages.

Chinese Patent Office, "First Office action," mailed in connection with Chinese Patent Application No. 200880120098.7, dated Aug. 29, 2011, 9 pages.

Sukittanon et al., "Modulation Scale Analysis for Content Identification," Dept of EE, University of Washington, Nov. 1, 2003, 12 pages.

International Bureau, "International Preliminary Report on Patentability," mailed in connection with International Application No. PCT/US2008/054434, dated Aug. 26, 2009, 10 pages.

Haitsma et al., "Robust Audio Hashing for Content Identification," Philips Research, philips.com, 2001, 8 pages.

International Bureau, "International Preliminary Report on Patentability," mailed in connection with International Application No. PCT/US2008/061783, dated Nov. 3, 2009, 8 pages.

International Bureau, "International Preliminary Report on Patentability," mailed in connection with International Application No. PCT/US2008/082657, dated Sep. 7, 2010, 7 pages.

International Bureau, "Written Opinion," mailed in connection with International Application No. PCT/US2008/061783, dated Jan. 29, 2009, 7 pages.

International Searching Authority, International Search Report for application No. PCT/US2008/061783, dated Jan. 29, 2009, 4 pages.

(56) References Cited

OTHER PUBLICATIONS

Crochiere et al. "Real-Time Speech Coding" Apr. 1982, 14 pages.
Haitsma et al., "A Highly Robust Audio Fingerprinting System," 2002, 9 pages.
Arnold, "Curriculum Vitae of John Fredrick Arnold," shown and sworn on Jun. 7, 2006, 39 pages.
Pang, "Curriculum Vitae of Dr. Khok Khee Pang," shown and sworn on Mar. 27, 2006, 15 pages.
Bull, "Curriculum Vitae of David John Bull," shown and sworn on Dec. 23, 2005, 6 pages.
Wai-Kai Chen, "The Circuits and Filters Handbook," pp. 137, 149, 157, 163, 721, and 2696. 1995, CRC Press.
Mibs, United Kingdom Radio Academy, Techcon Conference, http://www.ibs.org.uk/public/lineuparchive/2003/Aug-Sep/TECHCON.sub.--200- 3.pdf, 2 pages, Jul. 2003.
Australian Government, "Examiner's First Report," mailed in connection with Australian Patent Application No. 2008321318, dated Feb. 15, 2011, 2 pages.
International Bureau, "International Preliminary Report on Patentability," mailed in connection with counterpart international application No. PCT/US08/79595, dated May 27, 2010, 2 pages.
International Bureau, "Written Opinion," mailed in connection with counterpart international application No. PCT/US08/79595, dated May 27, 2010, 11 pages.
International Searching Authority, "International Search Report," mailed in connection with International Patent Application No. PCT/US2008/079595, dated Jan. 19, 2009, 5 pages.
International Searching Authority, "Written Opinion," mailed in connection with International Patent Application No. PCT/US2008/079595, dated Jan. 19, 2009, 11 pages.
International Searching Authority, "Written Opinion," mailed in connection with International Patent Application No. PCT/US2008/082657, dated Apr. 7, 2009, 7 pages.
United States Patent and Trademark Office, "Notice of Allowance," mailed in connection with U.S. Appl. No. 12/249,619, dated Dec. 26, 2012, 7 pages.
United States Patent and Trademark Office, "Supplemental Notice of Allowance," mailed in connection with U.S. Appl. No. 12/249,619, dated Sep. 21, 2012, 4 pages.
United States Patent and Trademark Office, "Notice of Allowance," mailed in connection with U.S. Appl. No. 12/249,619, dated Aug. 29, 2012, 9 pages.
Chinese Patent Office, "Third Office Action," mailed in connection with Chinese Patent Application No. 200880120098.7, dated Feb. 28, 2013, 7 pages.
United States Patent and Trademark Office, "Supplemental Notice of Allowance," mailed in connection with U.S. Appl. No. 12/361,991, dated Feb. 27, 2013, 2 pages.
Japanese Patent Office, "Notice of Allowance," mailed in connection with Japanese Patent Application No. 2010-534075, dated Oct. 15, 2013, 5 pages.
Canadian Intellectual Property Office, "Office Action," mailed in connection with Canadian Patent Application No. 2,705,549, dated Oct. 22, 2013, 2 pages.
IP Australia, "Patent Examination Report No. 1," mailed in connection with Australian Application No. 2012241085, dated Sep. 16, 2013, 3 pages.
Japanese Patent Office, "Office Action," mailed in connection with Japanese Patent Application No. 2010-534075, dated Jul. 2, 2013, 4 pages.
European Patent Office, "Examination Report," mailed in connection with Application No. 08850597.9, dated Feb. 25, 2015, 5 pages.
United States Patent and Trademark Office, "Notice of Allowance," mailed in connection with U.S. Appl. No. 12/361,991, dated Aug. 21, 2012, 4 pages.
United States Patent and Trademark Office, "Office Action," mailed in connection with U.S. Appl. No. 12/249,619, dated Mar. 21, 2012, 20 pages.
Canadian Intellectual Property Office, "Office Action," mailed in connection with Application No. 2,705,549, dated Jul. 25, 2014, 2 pages.
Chinese Patent Office, "Notice of Allowance," mailed in connection with Chinese Patent Application No. 200880120098.7, dated Aug. 1, 2013, 5 pages.
United States Patent and Trademark Office, "Supplemental Notice of Allowance," mailed in connection with U.S. Appl. No. 12/361,991, dated May 24, 2012, 2 pages.
IP Australia, "Notice of Acceptance," mailed in connection with Application No. 2012241085, dated Oct. 8, 2014, 2 pages.
United States Patent and Trademark Office, "Non-Final Office Action," mailed in connection with U.S. Appl. No. 13/907,286, dated Jun. 4, 2015, 15 pages.
Australian Government, "Notice of Grant ," mailed in connection with Australian Patent Application No. 2012241085, dated Feb. 5, 2015, 2 pages.
Canadian Intellectual Property Office, "Notice of Allowance," mailed in connection with Canadian Patent Application No. 2,705,549, dated Mar. 5, 2015, 1 page.
European Patent Office, "Summons to attend oral proceedings pursuant to Rule 115(1) EPC," mailed in connection with European Patent Application No. 08850597.9, Apr. 14, 2016, 6 pages.
United States Patent and Trademark Office, "Final Office Action," mailed in connection with U.S. Appl. No. 13/907,286, dated Dec. 14, 2015, 11 pages.
United States Patent and Trademark Office, "Non-Final Office Action," mailed in connection with U.S. Appl. No. 13/907,286, dated Jun. 13, 2016, 9 pages.
United States Patent and Trademark Office, "Notice of Allowance," mailed in connection with U.S. Appl. No. 13/730,271, dated May 27, 2016, 11 pages.
United States Patent and Trademark Office, "Final Office Action," mailed in connection with U.S. Appl. No. 13/730,271, dated Mar. 4, 2016, 10 pages.
United States Patent and Trademark Office, "Non-final Office Action," mailed in connection with U.S. Appl. No. 13/730,271, dated Sep. 17, 2015, 10 pages.
United States Patent and Trademark Office, "Final Office Action," mailed in connection with U.S. Appl. No. 13/730,271, dated May 13, 2015, 11 pages.
United States Patent and Trademark Office, "Non-Final Office Action," mailed in connection with U.S. Appl. No. 13/730,271, dated Dec. 16, 2014, 11 pages.
United States Patent and Trademark Office, "Notice of Allowance," issued in connection with U.S. Appl. No. 13/907,286, dated Dec. 6, 2017, 7 pages.
United States Patent and Trademark Office, "Non-Final Office Action," issued in connection with U.S. Appl. No. 13/907,286, dated Jun. 2, 2017, 5 pages.
European Patent Office, "Intention to Grant," issued in connection with European Patent Application No. 08850597.9, dated Dec. 5, 2016, 42 pages.
European Patent Office, "Decision to Grant," issued in connection with European Patent Application No. 08850597.9, dated Apr. 28, 2017, 2 pages.
Canadian Intellectual Property Office, "Notice of Allowance," issued in connection with Application No. 2,858,944, dated Feb. 1, 2017, 1 page.
United States Patent and Trademark Office, "Final Office Action," issued in connection with U.S. Appl. No. 13/907,286, dated Dec. 16, 2016, 7 pages.
International Searching Authority, "International Search Report," issued in connection with International Patent Application No. PCT/US2008/054434, dated Feb. 25, 2009, 4 pages.
International Searching Authority, "Written Opinion," issued in connection with International Patent Application No. PCT/US2008/054434, dated Feb. 25, 2009, 9 pages.
United States Patent and Trademark Office, "Non-Final Office Action," issued in connection with U.S. Appl. No. 15/973,154, dated Feb. 21, 2019, 11 pages.

(56) References Cited

OTHER PUBLICATIONS

United States Patent and Trademark Office, "Final Office Action," issued in connection with U.S. Appl. No. 15/973,154, dated Jul. 15, 2019, 5 pages.
United States Patent and Trademark Office, "Notice of Allowance," issued in connection with U.S. Appl. No. 15/973,154, dated Oct. 21, 2019, 8 pages.
United States Patent and Trademark Office, "Non-Final Office Action," issued in connection with U.S. Appl. No. 16/806,851, dated Jun. 23, 2020, 11 pages.
United States Patent and Trademark Office, "Notice of Allowance," issued in connection with U.S. Appl. No. 16/806,851, dated Dec. 4, 2020, 5 pages.
International Bureau, "International Preliminary Report on Patentability," mailed in connection with counterpart international application No. PCT/US2008/79595, dated May 18, 2010, 12 pages.
United States Patent and Trademark Office, "Non-Final Office Action," issued in connection with U.S. Appl. No. 15/269,158, dated Aug. 21, 2017, 9 pages.
United States Patent and Trademark Office, "Notice of Allowance," issued in connection with U.S. Appl. No. 15/269,158, dated Jan. 10, 2018, 5 pages.
United States Patent and Trademark Office, "Non-Final Office Action," issued in connection with U.S. Appl. No. 15/908,457, dated Nov. 23, 2018, 25 pages.
United States Patent and Trademark Office, "Final Office Action," issued in connection with U.S. Appl. No. 15/908,457, dated Jun. 12, 2019, 23 pages.
United States Patent and Trademark Office, "Advisory Action," issued in connection with U.S. Appl. No. 15/908,457, dated Sep. 13, 2019, 3 pages.
United States Patent and Trademark Office, "Ex Parte Quayle Action," issued in connection with U.S. Appl. No. 15/908,457, dated Sep. 26, 2019, 7 pages.
United States Patent and Trademark Office, "Notice of Allowance," issued in connection with U.S. Appl. No. 15/908,457, dated Dec. 19, 2019, 5 pages.
United States Patent and Trademark Office, "Non-Final Office Action," issued in connection with U.S. Appl. No. 16/989,574, dated Oct. 1, 2021, 20 pages.
United States Patent and Trademark Office, "Final Office Action," issued in connection with U.S. Appl. No. 16/989,574, dated Apr. 4, 2022, 21 pages.
United States Patent and Trademark Office, "Advisory Action," issued in connection with U.S. Appl. No. 16/989,574, dated Jul. 1, 2022, 3 pages.
United States Patent and Trademark Office, "Notice of Allowance," issued in connection with U.S. Appl. No. 16/989,574, dated Aug. 15, 2022, 11 pages.
United States Patent and Trademark Office, "Notice of Allowance," issued in connection with U.S. Appl. No. 16/989,574, dated Dec. 6, 2022, 12 pages.
United States Patent and Trademark Office, "Non-Final Office Action," issued in connection with U.S. Appl. No. 17/216,239, dated Aug. 2, 2022, 9 pages.
United States Patent and Trademark Office, "Notice of Allowance," issued in connection with U.S. Appl. No. 17/216,239, dated Dec. 6, 2022, 5 pages.
Doets et al., "Theoretical Modeling of a Robust Audio Fingerprinting System," Tech. Rep. Deift Univ. Technol., Deift, The Netherlands, 2004, (4 pages).
United States Patent and Trademark Office, "Notice of Allowance," issued in connection with U.S. Appl. No. 12/361,991, dated Feb. 21, 2012, 5 pages.
United States Patent and Trademark Office, "Notice of Allowance," issued in connection with U.S. Appl. No. 12/361,991, dated Feb. 7, 2013, 5 pages.
United States Patent and Trademark Office, "Notice of Allowance," issued in connection with U.S. Appl. No. 15/908,457, dated Mar. 27, 2020, 8 pages.
Canadian Intellectual Property Office, "Office Action," issued in connection with Application No. 2,858,944, dated Feb. 16, 2015, 5 pages.
United States Patent and Trademark Office, "Supplemental Notice of Allowability," issued in connection with U.S. Appl. No. 17/216,239, dated Dec. 21, 2022, 2 pages.
Canadian Intellectual Property Office, "Office Action," mailed in connection with Application No. 2,858,944, dated Jan. 19, 2016, 4 pages.

| States | S1 | S2 | S3 |  |  |  |  |  | S144 |
|---|---|---|---|---|---|---|---|---|---|
|  | FREQUENCY INDICES |||||||||
| Code Band 0 | 360 | 361 | 362 |  |  |  |  |  | 503 |
| Code Band 1 | 504 | 505 | 506 |  |  |  |  |  | 647 |
| Code Band 2 | 648 | 649 | 650 |  |  |  |  |  | 791 |
| Code Band 3 | 792 | 793 | 794 |  |  |  |  |  | 935 |
| Code Band 4 | 936 | 937 | 938 |  |  |  |  |  | 1079 |
| Code Band 5 | 1080 | 1081 | 1082 |  |  |  |  |  | 1223 |
| Code Band 6 | 1224 | 1225 | 1226 |  |  |  |  |  | 1366 |

FIG. 3A

| States | S1 | S2 | S3 | S4 |
|---|---|---|---|---|
|  | FREQUENCY INDICES ||||
| Code Band 0 | 10 | 11 | 12 | 13 |
| Code Band 1 | 14 | 15 | 16 | 17 |
| Code Band 2 | 18 | 19 | 20 | 21 |
| Code Band 3 | 22 | 23 | 24 | 25 |
| Code Band 4 | 26 | 27 | 28 | 29 |
| Code Band 5 | 30 | 31 | 32 | 33 |
| Code Band 6 | 34 | 35 | 36 | 37 |

FIG. 3B

| States | S1 | S2 | S3 |  |  |  |  | S23 | S24 |
|---|---|---|---|---|---|---|---|---|---|
|  | FREQUENCY INDICES |||||||||
| Code Band 0 | 60 | 61 |  |  |  |  |  | 82 | 83 |
| Code Band 1 | 84 | 85 |  |  |  |  |  |  |  |
| Code Band 2 |  |  |  |  |  |  |  |  |  |
| Code Band 3 |  |  |  |  |  |  |  |  |  |
| Code Band 4 |  |  |  |  |  |  |  |  |  |
| Code Band 5 |  |  |  |  |  |  |  |  |  |
| Code Band 6 | 204 | 205 |  |  |  |  |  |  | 227 |

FIG. 3C

METHODS AND APPARATUS TO PERFORM AUDIO WATERMARKING AND WATERMARK DETECTION AND EXTRACTION

CROSS REFERENCE TO RELATED APPLICATIONS

This patent arises from a continuation of U.S. patent application Ser. No. 17/216,239, filed Mar. 29, 2021, now U.S. patent Ser. No. 11/562,752, which is a continuation of U.S. patent application Ser. No. 16/806,851, filed Mar. 2, 2020, now U.S. Pat. No. 10,964,333, which is a continuation of U.S. patent application Ser. No. 15/973,154, filed May 7, 2018, now U.S. Pat. No. 10,580,421, which is a continuation of U.S. patent application Ser. No. 15/269,158, filed Sep. 19, 2016, now U.S. Pat. No. 9,972,332, which is a continuation of U.S. patent application Ser. No. 13/730,271, filed Dec. 28, 2012, now U.S. Pat. No. 9,460,730, which is a divisional of U.S. patent application Ser. No. 12/249,619, filed Oct. 10, 2008, now U.S. Pat. No. 8,369,972, which claims the benefit of U.S. Provisional Application Ser. Nos. 60/987,280 and 61/043,952, filed Nov. 12, 2007, and Apr. 10, 2008, respectively. U.S. patent application Ser. No. 17/216,239, U.S. patent application Ser. No. 16/806,851, U.S. patent application Ser. No. 15/973,154, U.S. patent application Ser. No. 15/269,158, U.S. patent application Ser. No. 13/730,271, U.S. patent application Ser. No. 12/249,619, U.S. Provisional Application Ser. No. 60/987,280 and U.S. Provisional Application Ser. No. 61/043,952 are hereby incorporated herein by reference in their respective entireties. Priority to U.S. patent application Ser. No. 17/216,239, U.S. patent application Ser. No. 16/806,851, U.S. patent application Ser. No. 15/973,154, U.S. patent application Ser. No. 15/269, 158, U.S. patent application Ser. No. 13/730,271, U.S. patent application Ser. No. 12/249,619, U.S. Provisional Application Ser. No. 60/987,280 and U.S. Provisional Application Ser. No. 61/043,952 is claimed.

TECHNICAL FIELD

The present disclosure relates generally to media monitoring and, more particularly, to methods and apparatus to perform audio watermarking and watermark detection and extraction.

BACKGROUND

Identifying media information and, more specifically, audio streams (e.g., audio information) is useful for assessing audience exposure to television, radio, or any other media. For example, in television audience metering applications, a code may be inserted into the audio or video of media, wherein the code is later detected at monitoring sites when the media is presented (e.g., played at monitored households). The information payload of the code/watermark embedded into original signal can consist of unique source identification, time of broadcast, transactional or additional content metadata. Monitoring sites typically include locations such as, for example, households where the media consumption of audience members or audience member exposure to the media is monitored. For example, at a monitoring site, codes from the audio and/or video are captured and may be associated with audio or video streams of media associated with a selected channel, radio station, media source, etc. The collected codes may then be sent to a central data collection facility for analysis. However, the collection of data pertinent to media exposure or consumption need not be limited to in-home exposure or consumption.

BRIEF DESCRIPTION OF THE DRAWINGS

FIGS. 3A-3C are charts illustrating different example code frequency configurations that may be used in the code frequency selector of FIG. 2.

DETAILED DESCRIPTION

Figure 1:
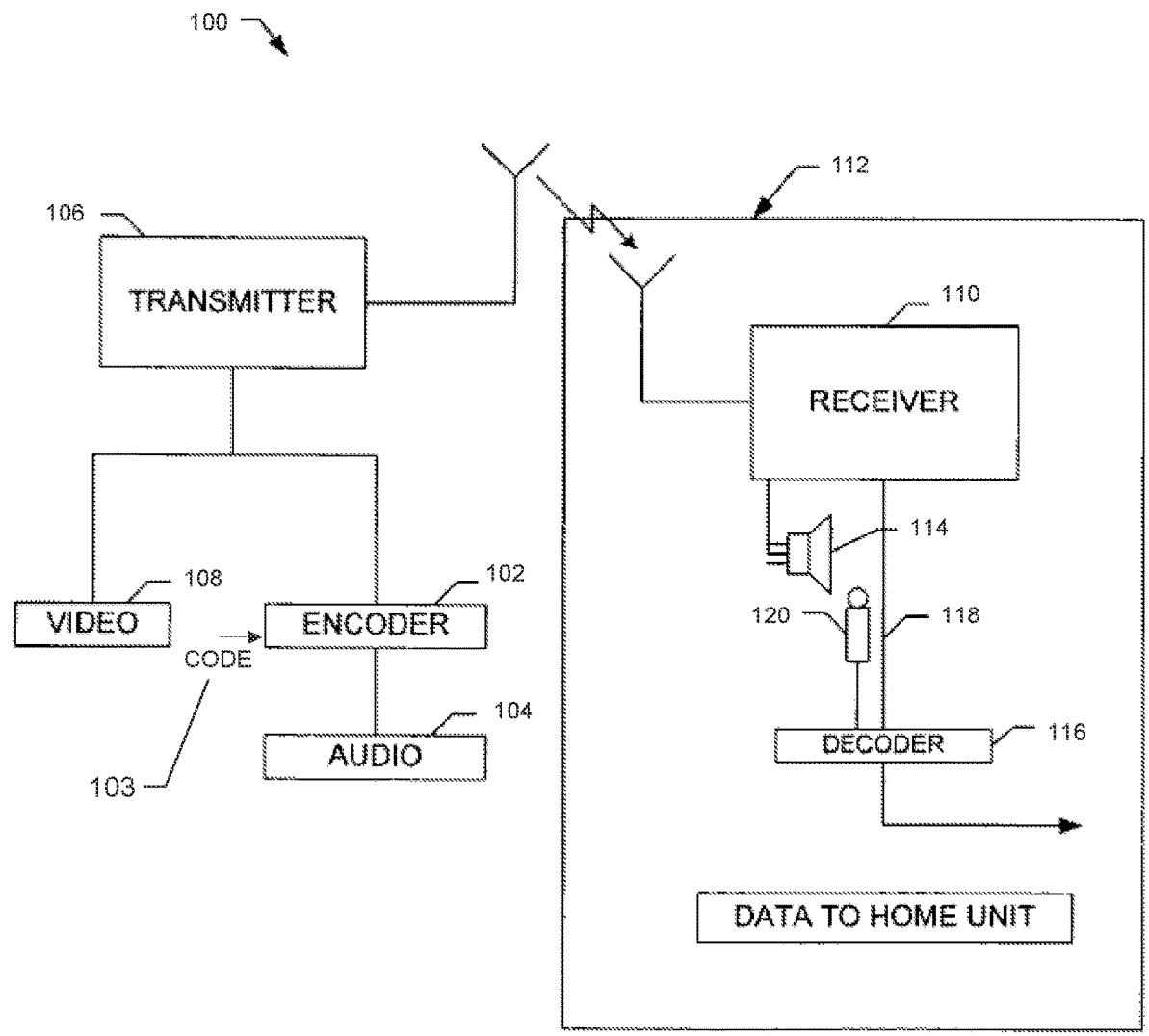
FIG. 1 is a schematic depiction of a broadcast audience measurement system employing a program identifying code added to the audio portion of a composite television signal.

The following description makes reference to audio encoding and decoding that is also commonly known as audio watermarking and watermark detection, respectively. It should be noted that in this context, audio may be any type of signal having a frequency falling within the normal human audibility spectrum. For example, audio may be speech, music, an audio portion of an audio and/or video program or work (e.g., a television program, a movie, an Internet video, a radio program, a commercial spot, etc.), a media program, noise, or any other sound.

In general, the encoding of the audio inserts one or more codes into the audio and ideally leaves the code inaudible to hearers of the audio. However, there may be certain situations in which the code may be audible to certain listeners. Additionally, the following refers to codes that may be encoded or embedded in audio; these codes may also be referred to as watermarks. The codes that are embedded in audio may be of any suitable length and any suitable technique for assigning the codes to information may be selected. Furthermore, as described below, the codes may be converted into symbols that are represented by signals having selected frequencies that are embedded in the audio. Any suitable encoding or error correcting technique may be used to convert codes into symbols.

The following examples pertain generally to encoding an audio signal with information, such as a code, and obtaining that information from the audio via a decoding process. The following example encoding and decoding processes may be used in several different technical applications to convey information from one place to another.

The example encoding and decoding processes described herein may be used to perform broadcast identification. In such an example, before a work is broadcast, that work is encoded to include a code indicative of the source of the work, the broadcast time of the work, the distribution channel of the work, or any other information deemed relevant to the operator of the system. When the work is presented (e.g., played through a television, a radio, a computing device, or any other suitable device), persons in the area of the presentation are exposed not only to the work, but, unbeknownst to them, are also exposed to the code embedded in the work. Thus, persons may be provided with decoders that operate on a microphone-based platform so that the work may be obtained by the decoder using free-field detection and processed to extract codes therefrom. The codes may then be logged and reported back to a central facility for further processing. The microphone-based decoders may be dedicated, stand-alone devices, or may be implemented using cellular telephones or any other types of devices having microphones and software to perform the decoding and code logging operations. Alternatively, wire-based systems may be used whenever the work and its attendant code may be picked up via a hard wired connection.

The example encoding and decoding processes described herein may be used, for example, in tracking and/or forensics related to audio and/or video works by, for example, marking copyrighted audio and/or associated video content with a particular code. The example encoding and decoding processes may be used to implement a transactional encoding system in which a unique code is inserted into a work when that work is purchased by a consumer. Thus, allowing a media distribution to identify a source of a work. The purchasing may include a purchaser physically receiving a tangible media (e.g., a compact disk, etc.) on which the work is included, or may include downloading of the work via a network, such as the Internet. In the context of transactional encoding systems, each purchaser of the same work receives the work, but the work received by each purchaser is encoded with a different code. That is, the code inserted in the work may be personal to the purchaser, wherein each work purchased by that purchaser includes that purchaser's code. Alternatively, each work may be may be encoded with a code that is serially assigned.

Furthermore, the example encoding and decoding techniques described herein may be used to carry out control functionality by hiding codes in a steganographic manner, wherein the hidden codes are used to control target devices programmed to respond to the codes. For example, control data may be hidden in a speech signal, or any other audio signal. A decoder in the area of the presented audio signal processes the received audio to obtain the hidden code. After obtaining the code, the target device takes some predetermined action based on the code. This may be useful, for example, in the case of changing advertisements within stores based on audio being presented in the store, etc. For example, scrolling billboard advertisements within a store may be synchronized to an audio commercial being presented in the store through the use of codes embedded in the audio commercial.

An example encoding and decoding system 100 is shown in FIG. 1. The example system 100 may be, for example, a television audience measurement system, which will serve as a context for further description of the encoding and decoding processes described herein. The example system 100 includes an encoder 102 that adds a code 103 to an audio signal 104 to produce an encoded audio signal. The code 103 may be representative of any selected information. For example, in a media monitoring context, the code 103 may be representative of an identity of a broadcast media program such as a television broadcast, a radio broadcast, or the like. Additionally, the code 103 may include timing information indicative of a time at which the code 103 was inserted into audio or a media broadcast time. Alternatively, as described below, the code may include control information that is used to control the behavior of one or more target devices.

The audio signal 104 may be any form of audio including, for example, voice, music, noise, commercial advertisement audio, audio associated with a television program, live performance, etc. In the example of FIG. 1, the encoder 102 passes the encoded audio signal to a transmitter 106. The transmitter 106 transmits the encoded audio signal along with any video signal 108 associated with the encoded audio signal. While, in some instances, the encoded audio signal may have an associated video signal 108, the encoded audio signal need not have any associated video.

Although the transmit side of the example system 100 shown in FIG. 1 shows a single transmitter 106, the transmit side may be much more complex and may include multiple levels in a distribution chain through which the audio signal 104 may be passed. For example, the audio signal 104 may be generated at a national network level and passed to a local network level for local distribution. Accordingly, although the encoder 102 is shown in the transmit lineup prior to the transmitter 106, one or more encoders may be placed throughout the distribution chain of the audio signal 104. Thus, the audio signal 104 may be encoded at multiple levels and may include embedded codes associated with those multiple levels. Further details regarding encoding and example encoders are provided below.

The transmitter 106 may include one or more of a radio frequency (RF) transmitter that may distribute the encoded audio signal through free space propagation (e.g., via terrestrial or satellite communication links) or a transmitter used to distribute the encoded audio signal through cable, fiber, etc. In one example, the transmitter 106 may be used to broadcast the encoded audio signal throughout a broad geographical area. In other cases, the transmitter 106 may distribute the encoded audio signal through a limited geographical area. The transmission may include up-conversion of the encoded audio signal to radio frequencies to enable propagation of the same. Alternatively, the transmission may include distributing the encoded audio signal in the form of digital bits or packets of digital bits that may be transmitted over one or more networks, such as the Internet, wide area networks, or local area networks. Thus, the encoded audio signal may be carried by a carrier signal, by information packets or by any suitable technique to distribute the audio signals.

When the encoded audio signal is received by a receiver 110, which, in the media monitoring context, may be located at a statistically selected metering site 112, the audio signal portion of the received program signal is processed to recover the code, even though the presence of that code is imperceptible (or substantially imperceptible) to a listener when the encoded audio signal is presented by speakers 114 of the receiver 110. To this end, a decoder 116 is connected either directly to an audio output 118 available at the receiver 110 or to a microphone 120 placed in the vicinity of the speakers 114 through which the audio is reproduced. The received audio signal can be either in a monaural or stereo format. Further details regarding decoding and example decoders are provided below.

Audio Encoding

Figure 2:
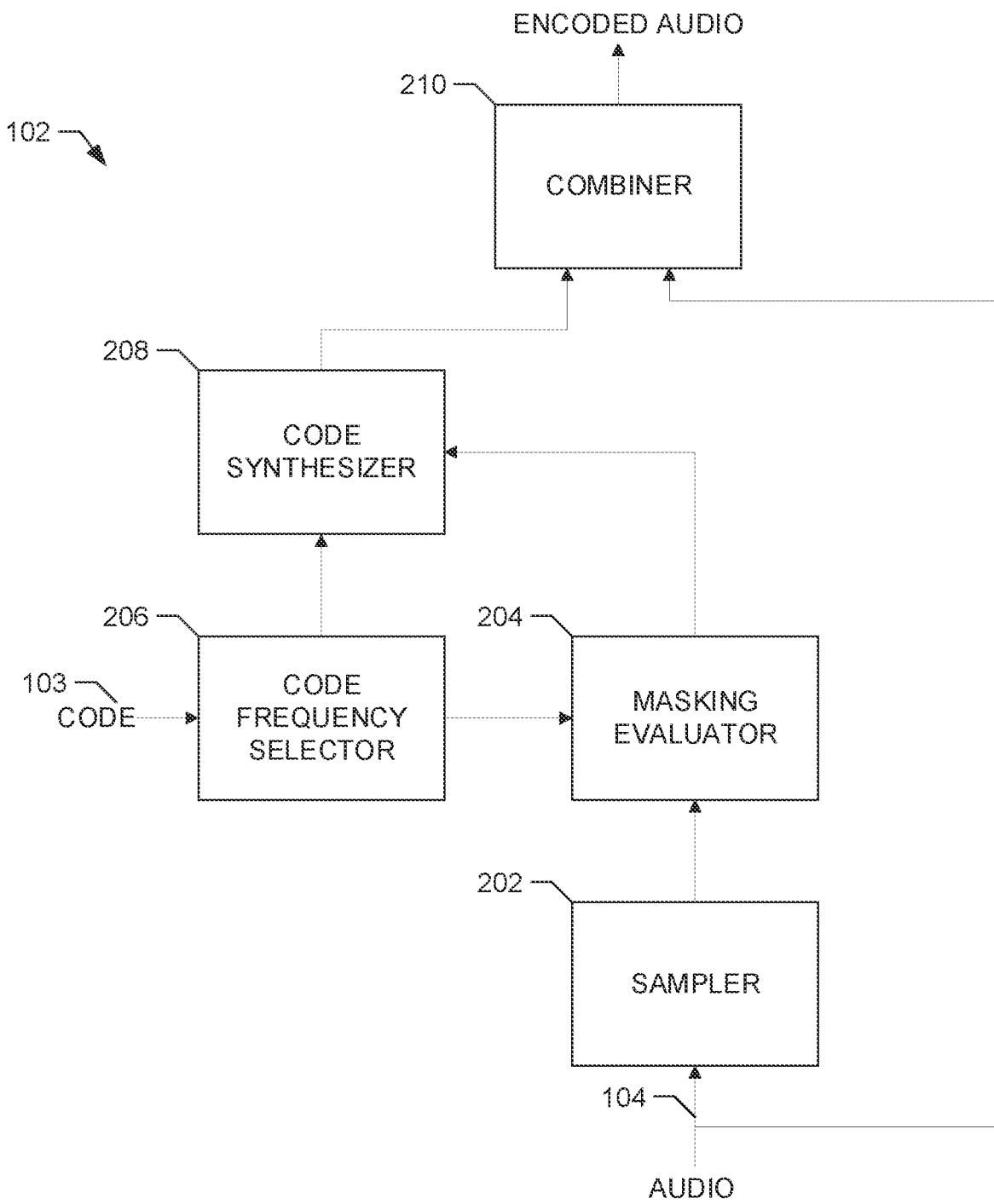
FIG. 2 is a block diagram of an example encoder of FIG. 1.

As explained above, the encoder 102 inserts one or more inaudible (or substantially inaudible) codes into the audio 104 to create encoded audio. One example encoder 102 is shown in FIG. 2. In one implementation, the example encoder 102 of FIG. 2 includes a sampler 202 that receives the audio 104. The sampler 202 is coupled to a masking evaluator 204, which evaluates the ability of the sampled audio to hide codes therein. The code 103 is provided to a code frequency selector 206 that determines audio code frequencies that are used to represent the code 103 to be inserted into the audio. The code frequency selector 206 may include conversion of codes into symbols and/or any suitable detection or correction encoding. An indication of the designated code frequencies that will be used to represent the code 103 are passed to the masking evaluator 204 so that the masking evaluator 204 is aware of the frequencies for which masking by the audio 104 should be determined. Additionally, the indication of the code frequencies is provided to a code synthesizer 208 that produces sine wave signals having frequencies designated by the code frequency selector 206. A combiner 210 receives both the synthesized code frequencies from the code synthesizer 208 and the audio that was provided to the sampler and combines the two to produce encoded audio.

In one example in which the audio 104 is provided to the encoder 102 in analog form, the sampler 202 may be implemented using an analog-to-digital (A/D) converter or any other suitable digitizer. The sampler 202 may sample the audio 104 at, for example, 48,000 Hertz (Hz) or any other sampling rate suitable to sample the audio 104 while satisfying the Nyquist criteria. For example, if the audio 104 is frequency-limited at 15,000 Hz, the sampler 202 may operate at 30,000 Hz. Each sample from the sampler 202 may be represented by a string of digital bits, wherein the number of bits in the string indicates the precision with which the sampling is carried out. For example, the sampler 202 may produce 8-bit, 16-bit, 24-bit, or 32-bit.

In addition to sampling the audio 104, the example sampler 202 accumulates a number of samples (i.e., an audio block) that are to be processed together. For example, the example sampler 202 accumulates a 512 sample audio block that is passed to the masking evaluator 204 at one time. Alternatively, in one example, the masking evaluator 204 may include an accumulator in which a number of samples (e.g., 512) may be accumulated in a buffer before they are processed.

The masking evaluator 204 receives or accumulates the samples (e.g., 512 samples) and determines an ability of the accumulated samples to hide code frequencies to human hearing. That is, the masking evaluator determines if code frequencies can be hidden within the audio represented by the accumulated samples by evaluating each critical band of the audio as a whole to determine its energy and determining the noise-like or tonal-like attributes of each critical band and determining the sum total ability of the critical bands to mask the code frequencies. Critical frequency bands, which were determined by experimental studies carried out on human auditory perception, may vary in width from single frequency bands at the low end of the spectrum to bands containing ten or more adjacent frequencies at the upper end of the audible spectrum. If the masking evaluator 204 determines that code frequencies can be hidden in the audio 104, the masking evaluator 204 indicates the amplitude levels at which the code frequencies can be inserted within the audio 104, while still remaining hidden and provides the amplitude information to the code synthesizer 208.

In one example, the masking evaluator 204 conducts the masking evaluation by determining a maximum change in energy $E_b$ or a masking energy level that can occur at any critical frequency band without making the change perceptible to a listener. The masking evaluation carried out by the masking evaluator 204 may be carried out as outlined in the Moving Pictures Experts Group—Advanced Audio Encoding (MPEG-AAC) audio compression standard ISO/IEC 13818-7:1997, for example. The acoustic energy in each critical band influences the masking energy of its neighbors and algorithms for computing the masking effect are described in the standards document such as ISO/IEC 13818-7:1997. These analyses may be used to determine for each audio block the masking contribution due to tonality (e.g., how much the audio being evaluated is like a tone) as well as noise like (i.e., how much the audio being evaluated is like noise) features. Further analysis can evaluate temporal masking that extends masking ability of the audio over short time, typically, for 50-100 ms. The resulting analysis by the masking evaluator 204 provides a determination, on a per critical band basis, the amplitude of a code frequency that can be added to the audio 104 without producing any noticeable audio degradation (e.g., without being audible).

In one example, the code frequency selector 206 may be implemented using a lookup table that relates an input code 103 to a state, wherein each state is represented by a number of code frequencies that are to be emphasized in the encoded audio signal. For example, the code frequency selector 206 may include information relating symbols or data states to sets of code frequencies that redundantly represent the data states. Of course, the number of states selected for use may be based on the types of input codes. For example, an input code representing two bits may be converted to code frequencies representing one of four symbols or states (e.g., $2^2$). In another example, an input code representing four bits of information may be represented by one of 16 symbols or states (e.g., $2^4$). Of course, some other encoding may be used to build in error correction when converting the code 103 to one or more symbols or states. Additionally, in some examples, more than one code may be embedded in the audio 104.

One example chart illustrating a code frequency configuration is shown in FIG. 3A at reference numeral 300. The chart includes frequency indices that range in value from 360 to 1366. These frequency indices correspond to frequencies of the sine waves to be embedded into an audio signal when viewed in the frequency domain via a Fourier transformation of a block of 18,432 samples. The reason that reference is made to frequency indices rather than actual frequencies is that the frequencies to which the indices correspond vary based on the sampling rate used within the encoder 102 and the number of samples processed by the decoder 116. The higher the sampling rate, the closer in frequency each of the indices is to its neighboring indices. Conversely, a low sampling rate results in adjacent indices that are relatively widely space in frequency. For example, at a sampling rate of 48,000 Hz, the spacing between the indices shown in the chart 300 of FIG. 3A is 2.6 Hz. Thus, frequency index 360 corresponds to 936 Hz (2.6 Hz×360).

As shown in FIG. 3A, the chart 300 includes a top row 302 listing 144 different states or symbols represented in columns, wherein the chart 300 shows the first three states and the last state. The states are selected to represent codes or portions of codes. The states between the third state and the last state are represented by dashed boxes for the sake of clarity. Each of the states occupies a corresponding column in the chart 300. For example, state S1 occupies a column denoted with reference numeral 304. Each column includes a number of frequency indices representing a frequency in each of seven different code bands, which are denoted in the left-hand column 306 of the chart 300. For example, as shown in column 304, the state S1 is represented by frequency indices 360, 504, 648, 792, 936, 1080, and 1224. To send one of the 144 states, the code indices in the column of the selected state are emphasized in a block of 18,432 samples. Thus, to send state S1, indices 360, 504, 6489, 792, 936, 1080, and 1224 are emphasized. In one example encoder 102, the indices of only one of the states are ever emphasized at one time.

As shown in FIG. 3A, each code band includes sequentially numbered frequency indices, one of which corresponds to each state. That is, Code Band 0 includes frequency indices 360-503, each corresponding to one of the 144 different states/symbols shown in the chart 300. Additionally, adjacent code bands in the system are separated by one frequency index. For example, Code Band 0 ranges from index 360 to index 503 and adjacent Code Band 1 ranges from index 504 to index 647. Thus, Code Band 0 is spaced one frequency index from adjacent Code Band 1. Advantageously, the code frequencies shown in FIG. 3A are close to one another in frequency and, thus, are affected in relatively the same manner by multipath interference. Additionally, the high level of redundancy in the chart 300 enhances the ability to recover the code.

Thus, if the code frequency selector 206 operates premised on the chart 300 of FIG. 3A, when an input code to the code frequency selector 206 is encoded or mapped to state S1, the code frequency selector 206 indicates to the masking evaluator 204 and the code synthesizer 208 that frequency indices 360, 504, 648, 792, 936, 1080, and 1224 should be emphasized in the encoded signal and, therefore, the code synthesizer 208 should produce sine waves having frequencies corresponding to the frequency indices 360, 504, 648, 792, 936, 1080, and 1224, and that such sine waves should be generated with amplitudes specified by the masking evaluator 204 so that the generated sine waves can be inserted into the audio 104, but will be inaudible (or substantially inaudible). By way of further example, when an input code identifies that state S144 should be encoded into the audio 104, the code frequency selector 206 identifies frequency indices 503, 647, 791, 935, 1079, 1223, and 1366 to the masking evaluator 204 and the code synthesizer 208 so that corresponding sine waves can be generated with appropriate amplitudes.

The encoding used to select states in the chart 300 to convey information may include data blocks and synchronization blocks. For example, the message to be encoded by the system using these 144 different states consists of a synchronization block that is followed by several data blocks. Each of the synchronization block and the data blocks is encoded into 18,432 samples and is represented by emphasizing the indices of one of the states shown in the chart 300 table below by emphasizing frequency indices shown in one column of the chart 300.

For example, a synchronization block is represented by emphasizing the indices of one of 16 states selected to represent synchronization information. That is, the synchronization block indicates the start of one of 16 different message types. For example, when considering media monitoring, network television stations may use a first state to represent synchronization and a local affiliate may use a second state to represent synchronization. Thus, at the start of a transmission, one of 16 different states is selected to represent synchronization and transmitted by emphasizing the indices associated with that state. Information payload data follows synchronization data.

In the foregoing example, with regard to how these 16 states representing synchronization information are distributed throughout the 144 states, in one example the 16 states are selected so that a frequency range including first code frequencies representing each of those 16 states is larger than a frequency amount separating that frequency range from an adjacent frequency range including second code frequencies also representing each of those 16 states. For example, the 16 states representing the synchronization information may be spaced every 9 states in the table above, such that states S1, S10, S19, S28, S37, S46, S54, S63, S72, S81, S90, S99, S108, S117, S126, S135 represent possible states that the synchronization information may take. In Code Band 0 and Code Band 1, this corresponds to a width in frequency indices of 135 indices. The frequency spacing between the highest possible synchronization state (S135) of Code Band 0 and the lowest possible synchronization state (S1) of Code Band 1 is 10 frequency indices. Thus, the range of each collection of frequency indices representing the synchronization information is much larger (e.g., 135 indices) than the amount separating adjacent collections (e.g., 10 indices).

In this example, the remaining 128 states of the 144 state space that are not used to represent synchronization maybe used to transmit information data. The data may be represented by any number of suitable states required to represent the number of desired bits. For example, 16 states may be used to represent four bits of information per state, or 128 states may be used to represent seven bits of information per state. In one example, the states selected to represent data are selected such that a frequency range including first code frequencies representing each of the data states is larger than a frequency amount separating that frequency range from an adjacent frequency range including second code frequencies also representing each of the data states. Thus, states used to represent potential data include at least one substantially low numbered state (e.g., S2) and at least one substantially high numbered state (e.g., S144). This ensures that the ranges including states that may be used to represent data occupy a wide bandwidth within their respective code bands, and that the spacing between adjacent ranges are narrow.

The encoder 102 may repeat the encoding process and, thereby, encode a number of audio blocks with a particular code. That is, the selected code frequencies may be inserted into several consecutive 512-sample audio blocks. In one example, the code frequencies representing symbols may be repeated in 36 consecutive audio blocks of 512 samples or 72 overlapping blocks of 256 samples. Thus, at the receive side, when 18,432 samples are processed by a Fourier transformation, the emphasized code frequencies will be visible in the resulting spectrum.

FIG. 3B shows an example alternative chart 330 that may be used by the code frequency selector 208, wherein the chart 330 lists four states in the first row 332, each of which includes corresponding frequency indices listed in seven code bands 334. These frequency indices correspond to frequencies of the sinusoids to be embedded into an audio signal when viewed in the frequency domain via a Fourier transformation of a block of 512 samples. By way of example, when state S1 is to be sent, the code frequency selector 206 indicates that frequency indices 10, 14, 18, 22, 26, 30, and 34 are to be used. As described above, the indication of these frequencies is communicated to the masking evaluator 204 and the code synthesizer 208, so that sine waves having the proper amplitude and corresponding to the indicated frequency indices may be generated for addition to the audio 104. In an example encoder 102 operating according to the chart 330, the code frequencies corresponding to the desired symbol are encoded into 2 overlapping blocks of 256 samples in order to make it detectable.

As with the chart 300 of FIG. 3A, the chart 330 indicates that the code bands are separated by the same frequency distance as the frequency indices representing adjacent symbol. For example, Code Band 0 includes a code frequency component having a frequency index of 13, which is one frequency index from the Code Band 1 frequency index 14 representing the state S1.

Chart 360 of FIG. 3C shows another example that may be used by the code frequency selector 208, wherein the chart 360 lists 24 states in the first row 362, each of which includes corresponding frequency indices listed in seven code bands 364. These frequency indices correspond to frequencies of the sinusoids to be embedded into an audio signal when viewed in the frequency domain via a Fourier transformation of a block of 3072 samples. By way of example, when state S1 is to be sent, the code frequency selector 206 indicates that frequency indices 60, 84, 108, 132, 156, 180, and 204 are to be used. As described above, the indication of these frequencies is communicated to the masking evaluator 204 and the code synthesizer 208, so that sine waves having the proper amplitude and corresponding to the indicated frequency indices may be generated for addition to the audio 104.

In an example encoder 102 operating according to the chart 360 of FIG. 3C, the code frequencies corresponding to the desired symbol are encoded in 12 overlapping blocks of 256 samples. In this implementation the first 16 columns may be used as data symbols and the 17th column may be used as a synchronization symbol. The remaining seven columns could be used for special data such as Video On Demand—for example, columns 18, 19, 20, 21, 22, 23 columns as auxiliary data symbols and these will be decoded as such only when an auxiliary synchronization symbol is present in column 24.

As with the charts 300 and 330 described above, the chart 360 indicates that the code bands are separated by the same frequency distance as the frequency indices representing adjacent symbol. For example, Code Band 0 includes a code frequency component having a frequency index of 83, which is one frequency index from the Code Band 1 frequency index 84 representing the state S1.

Returning now to FIG. 2, as described above, the code synthesizer 208 receives from the code frequency selector 206 an indication of the frequency indices required to be included to create an encoded audio signal including an indication of the input code. In response to the indication of the frequency indices, the code synthesizer 208 generates a number of sine waves (or one composite signal including multiple sine waves) having the identified frequencies. The synthesis may result in sine wave signals or in digital data representative of sine wave signals. In one example, the code synthesizer 208 generates the code frequencies with amplitudes dictated by the masking evaluator 204. In another example, the code synthesizer 208 generates the code frequencies having fixed amplitudes and those amplitudes may be adjusted by one or more gain blocks (not shown) that is within the code sequencer 208 or is disposed between the code synthesizer 208 and the combiner 210.

While the foregoing describes an example code synthesizer 208 that generates sine waves or data representing sine waves, other example implementations of code synthesizers are possible. For example, rather than generating sine waves, another example code synthesizer 208 may output frequency domain coefficients that are used to adjust amplitudes of certain frequencies of audio provided to the combiner 210. In this manner, the spectrum of the audio may be adjusted to include the requisite sine waves.

The combiner 210 receives both the output of the code synthesizer 208 and the audio 104 and combines them to form encoded audio. The combiner 210 may combine the output of the code synthesizer 208 and the audio 104 in an analog or digital form. If the combiner 210 performs a digital combination, the output of the code synthesizer 208 may be combined with the output of the sampler 202, rather than the audio 104 that is input to the sampler 202. For example, the audio block in digital form may be combined with the sine waves in digital form. Alternatively, the combination may be carried out in the frequency domain, wherein frequency coefficients of the audio are adjusted in accordance with frequency coefficients representing the sine waves. As a further alternative, the sine waves and the audio may be combined in analog form. The encoded audio may be output from the combiner 210 in analog or digital form. If the output of the combiner 210 is digital, it may be subsequently converted to analog form before being coupled to the transmitter 106.

Figure 4:
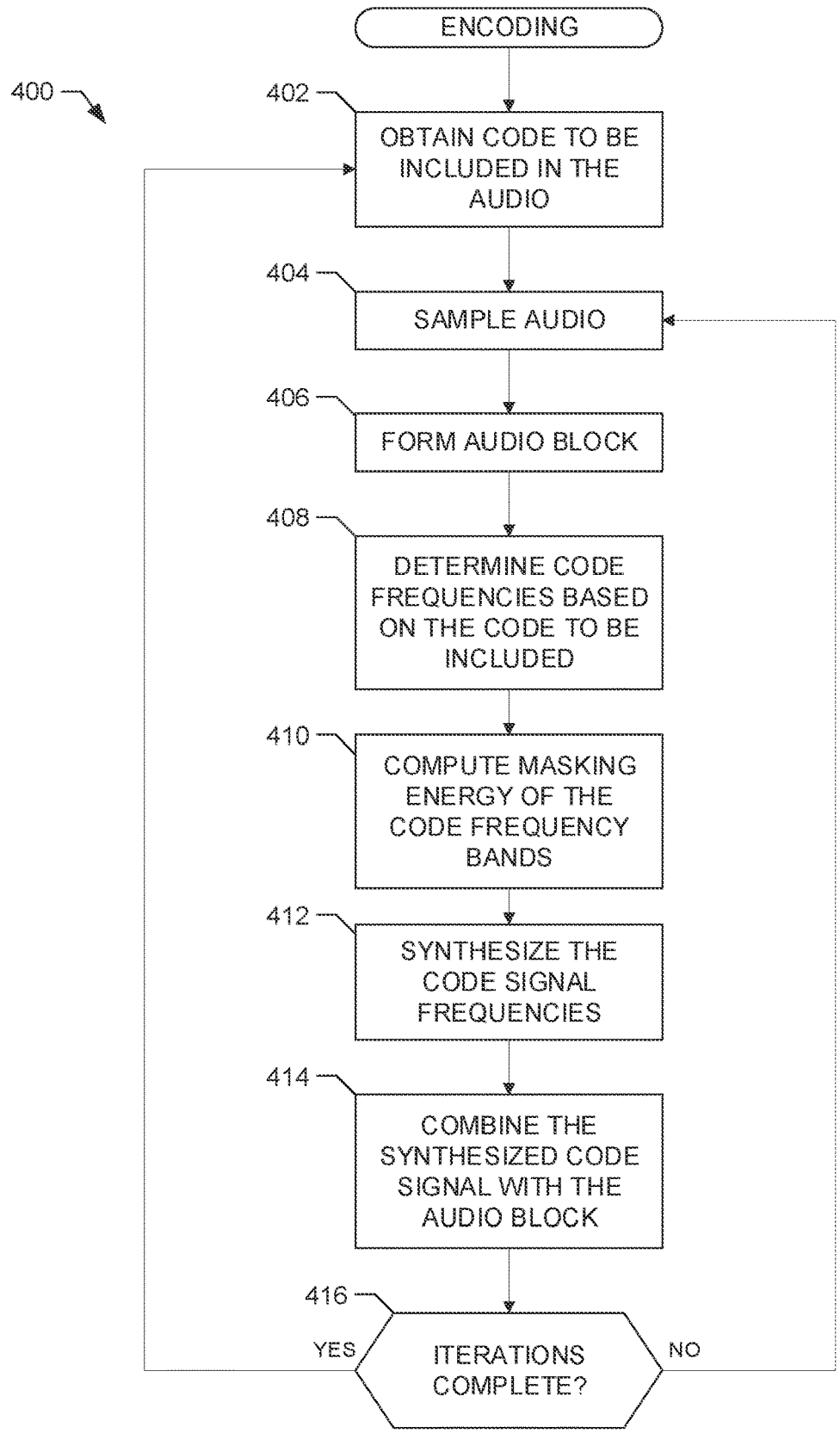
FIG. 4 is a flow diagram illustrating an example process that may be carried out by the example encoder of FIG. 2.

An example encoding process 400 is shown in FIG. 4. The example process 400 may be carried out by the example encoder 102 shown in FIG. 2, or by any other suitable encoder. The example process 400 begins when the code to be included in the audio is obtained (block 402). The code may be obtained via a data file, a memory, a register, an input port, a network connection, or any other suitable technique.

After the code is obtained (block 402), the example process 400 samples the audio into which the code is to be embedded (block 404). The sampling may be carried out at 48,000 Hz or at any other suitable frequency. The example process 400 then assembles the audio samples into a block of audio samples (block 406). The block of samples may include, for example, 512 audio samples. In some examples, blocks of samples may include both old samples (e.g., samples that have been used before in encoding information into audio) and new samples (e.g., samples that have not been used before in encoding information into audio). For example, a block of 512 audio samples may include 256 old samples and 256 new samples. Upon a subsequent iteration of the example process 400, the 256 new samples from a prior iteration may be used as the 256 old samples of the next iteration of the example process 400.

The example process 400 then determines the code frequencies that will be used to include the code (obtained at block 402) into the audio block (obtained at block 406) (block 408). This is an encoding process in which a code or code bits are converted into symbols that will be represented by frequency components. As described above, the example process 400 may use one or more lookup tables to convert codes to be encoded into symbols representative of the codes, wherein those symbols are redundantly represented by code frequencies in the audio spectrum. As described above, seven frequencies may be used to redundantly represent the selected symbol in the block of audio. The selection of symbols to represent codes may include consideration of the block number being processed error coding, etc.

Having obtained the audio into which the codes are to be included (block 406), as well as the code frequencies that are to be used to represent the codes (block 408), the process 400 computes the ability of the audio block to mask the selected code frequencies (block 410). As explained above, the masking evaluation may include conversion of the audio block to the frequency domain and consideration of the tonal or noise-like properties of the audio block, as well as the amplitudes at various frequencies in the block. Alternatively, the evaluation may be carried out in the time domain.

Additionally, the masking may also include consideration of audio that was in a previous audio block. As noted above, the masking evaluation may be carried out in accordance with the MPEG-AAC audio compression standard ISO/IEC 13818-7:1997, for example. The result of the masking evaluation is a determination of the amplitudes or energies of the code frequencies that are to be added to the audio block, while such code frequencies remain inaudible or substantially inaudible to human hearing.

Having determined the amplitudes or energies at which the code frequencies should be generated (block 410), the example process 400 synthesizes one or more sine waves having the code frequencies (block 412). The synthesis may result in actual sine waves or may result in digital data equivalent representative of sine waves. In one example, the sine waves may be synthesized with amplitudes specified by the masking evaluation. Alternatively, the code frequencies may be synthesized with fixed amplitudes and then amplitudes of the code frequencies may be adjusted subsequent to synthesis.

The example process 400 then combines the synthesized code frequencies with the audio block (block 414). The combination may be carried out through addition of data representing the audio block and data representing the synthesized sine waves, or may be carried out in any other suitable manner.

In another example, the code frequency synthesis (block 412) and the combination (block 414) may be carried out in the frequency domain, wherein frequency coefficients representative of the audio block in the frequency domain are adjusted per the frequency domain coefficients of the synthesized sine waves.

As explained above, the code frequencies are redundantly encoded into consecutive audio blocks. In one example, a particular set of code frequencies is encoded into 36 consecutive blocks. Thus, the example process 400 monitors whether it has completed the requisite number of iterations (block 416) (e.g., the process 400 determines whether the example process 400 has been repeated 36 times to redundantly encode the code frequencies). If the example process 400 has not completed the requisite iterations (block 416), the example process 400 samples audio (block 404), analyses the masking properties of the same (block 410), synthesizes the code frequencies (block 412) and combines the code frequencies with the newly acquired audio block (block 414), thereby encoding another audio block with the code frequencies.

However, when the requisite iterations to redundantly encode the code frequencies into audio blocks have completed (block 416), the example process 400 obtains the next code to be included in the audio (block 402) and the example process 400 iterates. Thus, the example process 400 encodes a first code into a predetermined number of audio blocks, before selecting the next code to encode into a predetermined number of audio blocks, and so on. It is, however, possible, that there is not always a code to be embedded in the audio. In that instance, the example process 400 may be bypassed. Alternatively, if no code to be included is obtained (block 402), no code frequencies will by synthesized (block 412) and, thus, there will be no code frequencies to alter an audio block. Thus, the example process 400 may still operate, but audio blocks may not always be modified—especially when there is no code to be included in the audio.

Audio Decoding

In general, the decoder 116 detects the code signal that was inserted into the audio to form encoded audio at the encoder 102. That is, the decoder 116 looks for a pattern of emphasis in code frequencies it processes. Once the decoder 116 has determined which of the code frequencies have been emphasized, the decoder 116 determines, based on the emphasized code frequencies, the symbol present within the encoded audio. The decoder 116 may record the symbols, or may decode those symbols into the codes that were provided to the encoder 102 for insertion into the audio.

Figure 5:
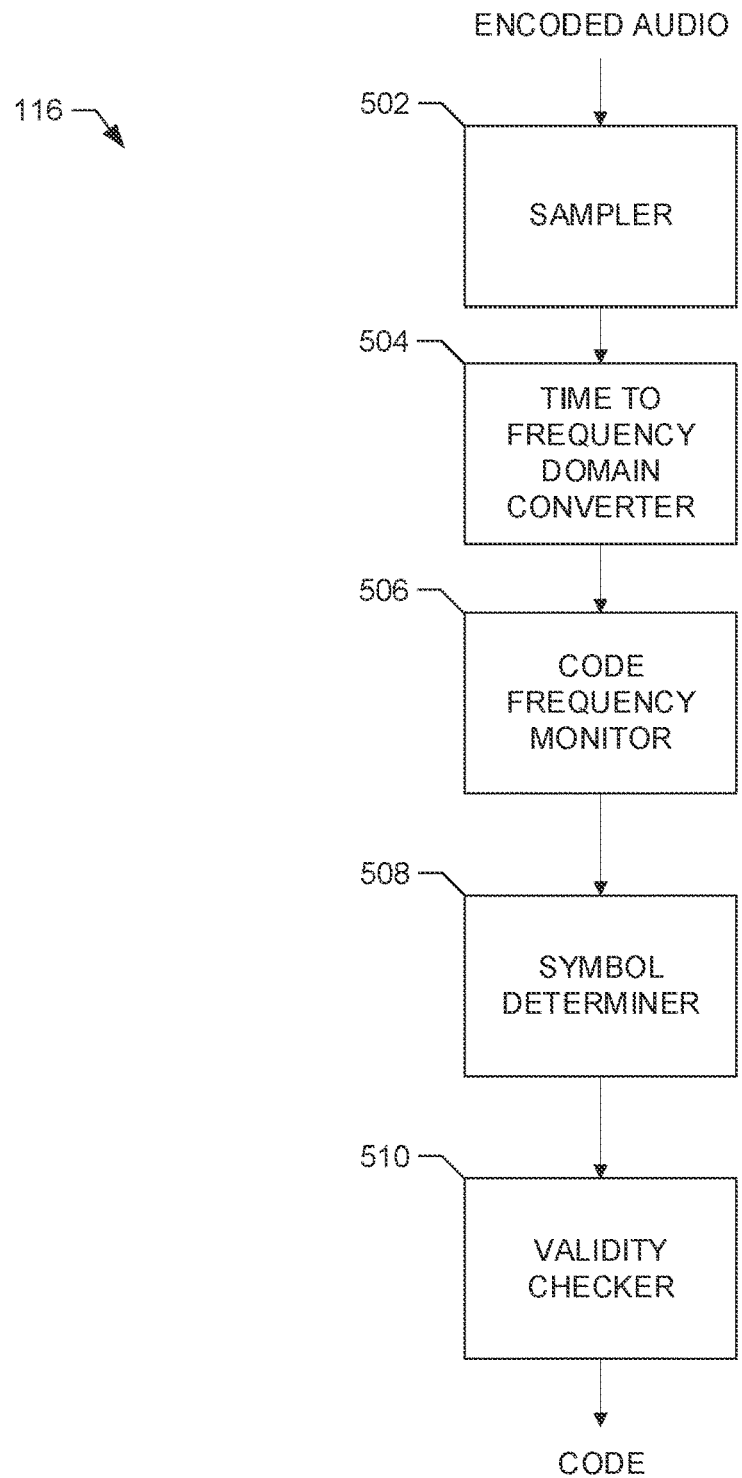
FIG. 5 is a block diagram of an example decoder of FIG. 1.

As shown in FIG. 5, an example decoder 116 includes a sampler 502, which may be implemented using an A/D or any other suitable technology, to which encoded audio is provided in analog format. As shown in FIG. 1, the encoded audio may be provided by a wired or wireless connection to the receiver 110. The sampler 502 samples the encoded audio at, for example, a sampling frequency of 48,000 Hz. Of course, lower sampling frequencies may be advantageously selected in order to reduce the computational load at the time of decoding. For example, at a sampling frequency of 8 kHz the Nyquist frequency is 4 kHz and therefore all the embedded code signal is preserved because its spectral frequencies are lower than the Nyquist frequency. The 18,432-sample DFT block length at 48 kHz sampling rate is reduced to 3072 samples at 8 kHz sampling rate. However even at this modified DFT block size the code frequency indices are identical to the original and range from 360 to 1367.

The samples from the sampler 502 are provided to a time to frequency domain converter 504. The time to frequency domain converter 504 may be implemented using a discrete Fourier transformation (DFT), or any other suitable technique to convert time-based information into frequency-based information. In one example, the time to frequency domain converter 504 may be implemented using a sliding DFT in which a spectrum is calculated each time a new sample is provided to the example time to frequency converter 504. In one example, the time to frequency domain converter 504 uses 18,432 samples of the encoded audio and determines a spectrum therefrom. The resolution of the spectrum produced by the time to frequency domain converter 504 increases as the number of samples used to generate the spectrum. Thus, the number of samples processed by the time to frequency domain converter 504 should match the resolution used to select the indices in the charts of FIG. 3A, 3B, or 3C.

The spectrum produced by the time to frequency domain converter 504 passes to a code frequency monitor 506, which monitors all the frequencies or spectral lines corresponding to the frequency indices that can potentially carry codes inserted by the example encoder 102. For example, if the example encoder 102 sends data based on the chart of FIG. 3A, the code frequency monitor 506 monitors the frequencies corresponding to indices 360-1366.

The monitoring of the code frequencies includes evaluating the spectral energies at each of the code frequencies. Thus, the code frequency monitor 506 normalizes the energies for a specific row of the chart of FIG. 3A to a maximum energy in that row of the chart. For example, considering the frequency indices corresponding to Code Band 0 of the chart of FIG. 3A, if the frequency corresponding to frequency index 360 has the maximum energy of the other frequencies in the row representing Code Band 0 (e.g., frequency indices 361, 362, . . . 503) each of the energies at the other frequencies corresponding to the indices in Code Band 0 divided by the energy of the frequency corresponding to frequency index 360. Thus, the normalized energy for frequency index 360 will have a value of 1 and all of the remaining frequencies corresponding to frequency indices in Code Band 0 will have values smaller than 1. This normalization process is repeated for each row of the chart 300. That is, each Code Band in the chart of FIG. 3A will include one frequency having its energy normalized to 1, with all remaining energies in that Code Band normalized to something less than 1.

Based on the normalized energies produced by the code frequency monitor 506, a symbol determiner 508 to determines the symbol that was present in the encoded audio. In one example, the symbol determiner 508 sums all of the normalized energies corresponding to each state. That is, the symbol determiner 508 creates 144 sums, each corresponding to a column, or state, in the chart 300. The column or state having the highest sum of normalized energies is determined to be the symbol that was encoded. The symbol determiner may use a lookup table similar to the lookup table of FIG. 3A that can be used to map emphasized frequencies to the symbols to which they correspond. For example, if state S1 was encoded into the audio, the normalized energies will generally result in a value of one for each frequency index representing state S1. That is, in general, all other frequencies in the Code Bands that do not correspond to state S1 will have a value less than one. However, while this is generally true, not every frequency index corresponding to state S1 will have a value of one. Thus, a sum of the normalized energies is calculated for each state. In this manner, generally, the normalized energies corresponding to the frequency indices representing state S1 will have a greater sum than energies corresponding to the frequency indices representing other states. If the sum of normalized energies corresponding to the frequency indices representing state S1 exceeds a threshold of 4.0 for detection, state S1 is determined to be the most probable symbol that was embedded in the encoded audio. If, however, the sum does not exceed the threshold, there is insufficient confidence that state S1 was encoded, and no state is determined to be the most probable state. Thus, the output of the symbol determiner 508 is a stream of most probable symbols that were encoded into the audio. Under ideal conditions, the code frequencies of S1 will yield a normalized score of 7.0

The most probable symbols are processed by the validity checker 510 to determine if the received symbols correspond to valid data. That is, the validity checker 510 determines if bits corresponding to the most probable symbol are valid given the encoding scheme used to convert the code into a symbol at the code frequency selector 206 of the encoder 102. The output of the validity checker 510 is the code, which corresponds to the code provided to the code frequency selector 206 of FIG. 2.

Figure 6:
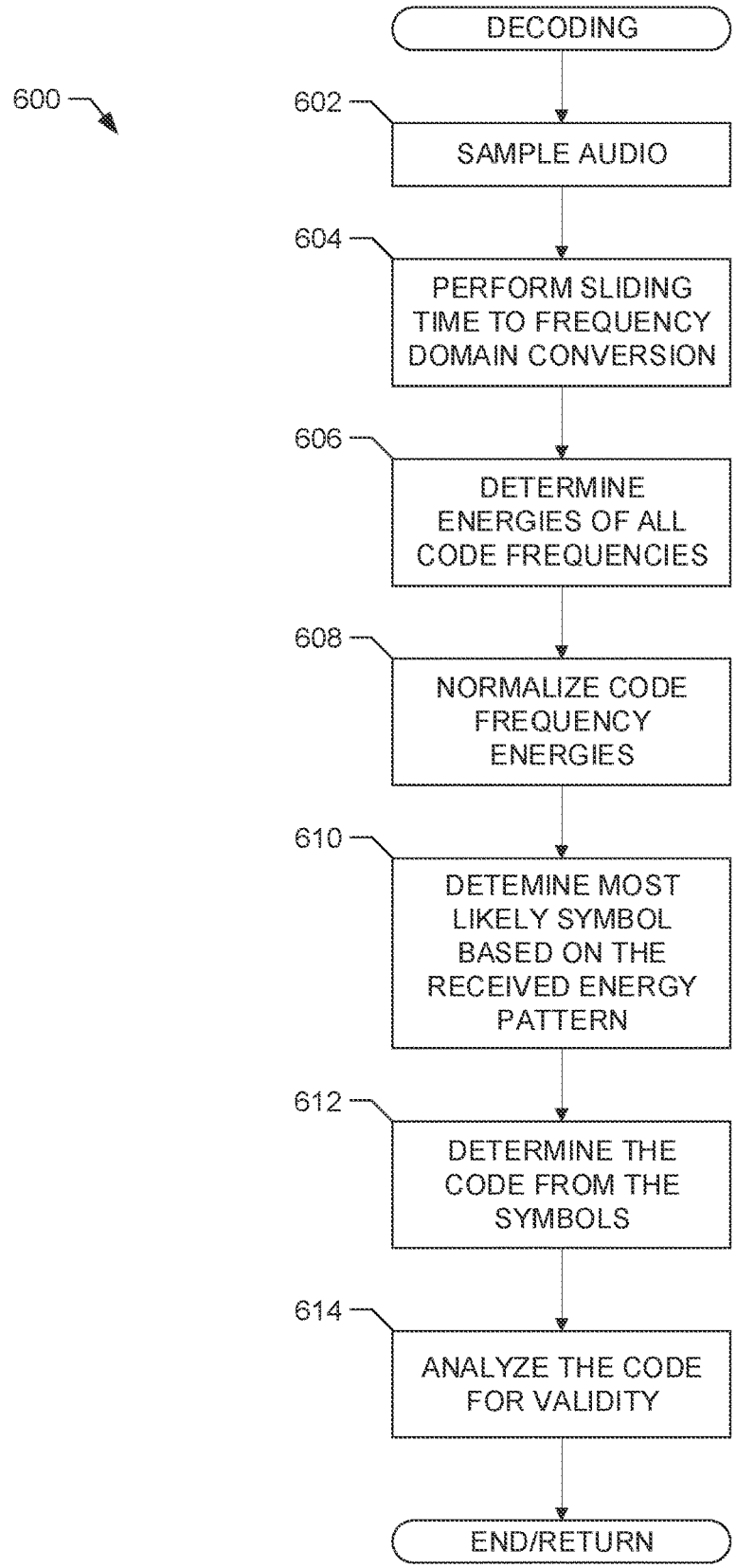
FIG. 6 is a flow diagram illustrating an example process that may be carried out by the example decoder of FIG. 4.

An example decoding process 600 is shown in FIG. 6. The example process 600 may be carried out by the example decoder 116 shown in FIG. 5, or by any other suitable decoder. The example process 600 begins by sampling audio (block 602). The audio may be obtained via an audio sensor, a hardwired connection, via an audio file, or through any other suitable technique. As explained above the sampling may be carried out at 48,000 Hz, or any other suitable frequency.

As each sample is obtained, a sliding time to frequency conversion is performed on a collection of samples including numerous older samples and the newly added sample obtained at block 602 (block 604). In one example, a sliding DFT may be used to process streaming input samples including 18,431 old samples and the one newly added sample. In one example, the DFT using 18,432 samples results in a spectrum having a resolution of 2.6 Hz.

After the spectrum is obtained through the time to frequency conversion (block 604), the energies of the code frequencies are determined (block 606). In one example, the energies may be obtained by taking the magnitude of the result of the time to frequency conversion (block 604) for the frequency components that may be emphasized to encode the audio. Importantly, to save processing time and minimize memory consumption, only frequency information corresponding to the code frequencies may be retained and processed further, because those frequencies are the only frequencies at which encoded information may be located. Of course, the example process 600 may use other information that the energies. For example, the example process 600 could retain both magnitude and phase information and process the same.

Additionally, the frequencies that are processed in the process 600 may be further reduced by considering a previously-received synchronization symbol. For example, if a particular synchronization symbol is always followed by one of six different symbols, the frequencies that are processed may be reduced to those of the six different symbols after that particular synchronization symbol is received.

After the energies are determined (block 606), the example process 600 normalizes the code frequency energies of each Code Block based on the largest energy in that Code Block (block 608). That is, the maximum energy of a code frequency in a Code Block is used as a divisor against itself and all other energies in that Code Block. The normalization results in each Code Block having one frequency component having a normalized energy value of one, with all other normalized energy values in that Code Block having values less than one. Thus, with reference to FIG. 3A, each row of the chart 300 will have one entry having a value of one and all other entries will have values less than one.

The example process 600 then operates on the normalized energy values to determine the most likely symbol based thereon (block 610). As explained above, this determination includes, for example, summing the normalized energy values corresponding to each symbol, thereby resulting in the same number of sums as symbols (e.g., in consideration of the chart of FIG. 3A, there would be 144 sums, each of which corresponds to one of the 144 symbols). The largest sum is then compared to a threshold (e.g., 4.0) and if the sum exceeds the threshold, the symbol corresponding to the largest sum is determined to be the received symbol. If the largest sum does not exceed the threshold, no symbol is determined to be the received symbol.

After having determining the received symbol (block 610), the example process 600 determines the code corresponding to the received symbol (block 612). That is, the example process 600 decodes the encoding of a code into a symbol that was carried out by the example encoding process 400 (e.g., the encoding performed by block 408).

After the decoding is complete and codes are determined from symbols (block 612), the example process 600 analyzes the code for validity (block 614). For example, the received codes may be examined to determine if the code sequence is valid based on the encoding process by which codes are sent. Valid codes are logged and may be sent back to a central processing facility at a later time, along with a time and date stamp indicating when the codes were received.

While example manners of implementing any or all of the example encoder 102 and the example decoder 116 have been illustrated and described above one or more of the data structures, elements, processes and/or devices illustrated in the drawings and described above may be combined, divided, re-arranged, omitted, eliminated and/or implemented in any other way. Further, the example encoder 102 and example decoder 116 may be implemented by hardware, software, firmware and/or any combination of hardware, software and/or firmware. Thus, for example, the example encoder 102 and the example decoder 116 could be implemented by one or more circuit(s), programmable processor(s), application specific integrated circuit(s) (ASIC(s)), programmable logic device(s) (PLD(s)) and/or field programmable logic device(s) (FPLD(s)), etc. For example, the decoder 116 may be implemented using software on a platform device, such as a mobile telephone. If any of the appended claims is read to cover a purely software implementation, at least one of the example sampler 202, the example masking evaluator 204, the example code frequency selector 206, the example code synthesizer 208, and the example combiner 210 of the encoder 102 and/or one or more of the example sampler 502, the example time to frequency domain converter 504, the example code frequency monitor 506, the example statistical processor 508, the example symbol determiner 510 and/or the example validity checker 512 of the example decoder 116 are hereby expressly defined to include a tangible medium such as a memory, DVD, CD, etc. Further still, the example encoder 102 and the example decoder 116 may include data structures, elements, processes and/or devices instead of, or in addition to, those illustrated in the drawings and described above, and/or may include more than one of any or all of the illustrated data structures, elements, processes and/or devices.

Figure 7:
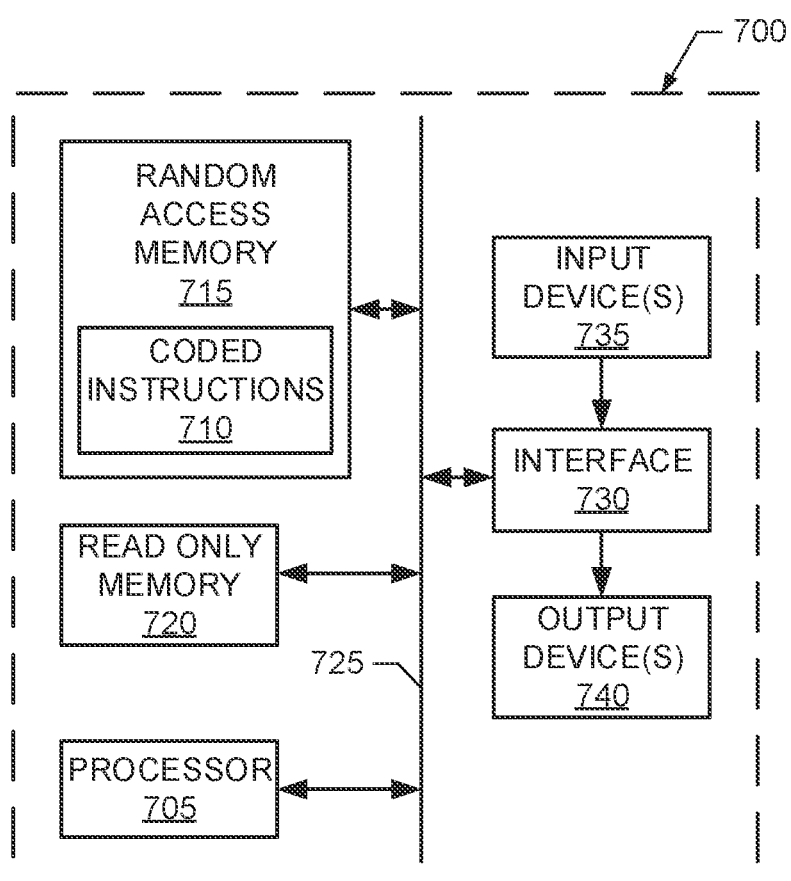
FIG. 7 is a schematic illustration of an example processor platform that may be used and/or programmed to perform any or all of the processes or implement any or all of the example systems, example apparatus and/or example methods described herein.

FIG. 7 is a schematic diagram of an example processor platform 700 that may be used and/or programmed to implement any or all of the example encoder 102 and the decoder 116, and/or any other component described herein. For example, the processor platform 700 can be implemented by one or more general purpose processors, processor cores, microcontrollers, etc. Additionally, the processor platform 700 may be implemented as a part of a device having other functionality. For example, the processor platform 700 may be implemented using processing power provided in a mobile telephone, or any other handheld device.

The processor platform 700 of the example of FIG. 7 includes at least one general purpose programmable processor 705. The processor 705 executes coded instructions 710 present in main memory of the processor 705 (e.g., within a RAM 715 and/or a ROM 720). The processor 705 may be any type of processing unit, such as a processor core, a processor and/or a microcontroller. The processor 705 may execute, among other things, example machine accessible instructions implementing the processes described herein. The processor 705 is in communication with the main memory (including a ROM 720 and/or the RAM 715) via a bus 725. The RAM 715 may be implemented by DRAM, SDRAM, and/or any other type of RAM device, and ROM may be implemented by flash memory and/or any other desired type of memory device. Access to the memory 715 and 720 may be controlled by a memory controller (not shown).

The processor platform 700 also includes an interface circuit 730. The interface circuit 730 may be implemented by any type of interface standard, such as a USB interface, a Bluetooth interface, an external memory interface, serial port, general purpose input/output, etc. One or more input devices 735 and one or more output devices 740 are connected to the interface circuit 730.

Although certain example apparatus, methods, and articles of manufacture are described herein, other implementations are possible. The scope of coverage of this patent is not limited to the specific examples described herein. On the contrary, this patent covers all apparatus, methods, and articles of manufacture falling within the scope of the invention.

What is claimed is:

1. An apparatus to decode information encoded in an audio signal, the apparatus comprising:
   memory;
   instructions; and
   one or more processors configured to execute the instructions to:
   determine characteristics of frequencies of a frequency domain representation of the audio signal;
   normalize the characteristics of the frequencies of the frequency domain representation in respective ones of a plurality of code bands to determine normalized characteristics of the frequencies, a first code band of the plurality of code bands to be normalized against a first characteristic of a first frequency in the first code band;
   compute a sum of the normalized characteristics of the frequencies;
   determine that the sum is representative of a symbol when the sum satisfies a threshold; and
   output a code corresponding to the symbol.

2. The apparatus of claim 1, wherein the code is encoded in the audio signal with a plurality of frequency components in the plurality of code bands, different sets of the frequency components representing respectively different symbols, one frequency component from each of the sets of the frequency components located in a corresponding code band of the plurality of code bands, a first spacing between adjacent code bands of the plurality of code bands being less than or equal to than a second spacing between adjacent frequency components of one of the plurality of code bands.

3. The apparatus of claim 2, wherein the first characteristic is a magnitude of a first frequency component in the first code band, the first component associated with a higher energy compared to other frequency components in the first code band.

4. The apparatus of claim 1, wherein the one or more processors are configured to determine that the code is valid based on an encoding process.

5. The apparatus of claim 1, wherein the code includes synchronization information.

6. The apparatus of claim 1, wherein the characteristics of the frequencies include amplitudes of the frequencies.

7. The apparatus of claim 1, wherein the characteristics of the frequencies include energies of the frequencies.

8. A computer readable memory or storage device comprising instructions that, when executed, cause one or more processors to at least:
   determine characteristics of frequencies of a frequency domain representation of an audio signal;
   normalize the characteristics of the frequencies of the frequency domain representation in respective ones of a plurality of code bands to determine normalized characteristics of the frequencies, a first code band of the plurality of code bands to be normalized against a first characteristic of a first frequency in the first code band;
   compute a sum of the normalized characteristics of the frequencies;

determine that the sum is representative of a symbol when the sum satisfies a threshold; and output a code corresponding to the symbol.

9. The computer readable memory or storage device of claim 8, wherein the code is encoded in the audio signal with a plurality of frequency components in the plurality of code bands, different sets of the frequency components representing respectively different symbols, one frequency component from each of the sets of the frequency components located in a corresponding code band of the plurality of code bands, a first spacing between adjacent code bands of the plurality of code bands being less than or equal to than a second spacing between adjacent frequency components of one of the plurality of code bands.

10. The computer readable memory or storage device of claim 9, wherein the first characteristic is a magnitude of a first frequency component in the first code band having a higher energy compared to other frequency components in the first code band.

11. The computer readable memory or storage device of claim 8, wherein the instructions cause the one or more processors to determine that the code is valid based on an encoding process.

12. The computer readable memory or storage device of claim 8, wherein the code includes synchronization information.

13. The computer readable memory or storage device of claim 8, wherein the characteristics of the frequencies include amplitudes of the frequencies.

14. The computer readable memory or storage device of claim 8, wherein the characteristics of the frequencies include energies of the frequencies.

15. A method to decode information encoded in an audio signal, the method comprising:

determining, one or more processors, characteristics of frequencies of a frequency domain representation of the audio signal;

normalizing, by the one or more processors, the characteristics of the frequencies of the frequency domain representation in respective ones of a plurality of code bands to determine normalized characteristics of the frequencies, a first code band of the plurality of code bands to be normalized against a first characteristic of a first frequency in the first code band;

computing, by the one or more processors, a sum of the normalized characteristics of the frequencies;

determining, by the one or more processors, that the sum is representative of a symbol when the sum satisfies a threshold; and outputting, by the one or more processors, a code corresponding to the symbol.

16. The method of claim 15, wherein the code is encoded in the audio signal with a plurality of frequency components in the plurality of code bands, different sets of the frequency components representing respectively different symbols, one frequency component from each of the sets of the frequency components located in a corresponding code band of the plurality of code bands, a first spacing between adjacent code bands of the plurality of code bands being less than or equal to than a second spacing between adjacent frequency components of one of the plurality of code bands.

17. The method of claim 16, wherein the first characteristic is a magnitude of a first frequency component in the first code band having a higher energy compared to other frequency components in the first code band.

18. The method of claim 15, further including determining that the code is valid based on an encoding process.

19. The method of claim 15, wherein the code includes synchronization information.

20. The method of claim 15, wherein the characteristics of the frequencies include at least one of amplitudes of the frequencies or energies of the frequencies.

* * * * *